United States Patent
Pham

(10) Patent No.: US 10,528,820 B2
(45) Date of Patent: Jan. 7, 2020

(54) COLOUR LOOK-UP TABLE FOR BACKGROUND SEGMENTATION OF SPORT VIDEO

(71) Applicant: CANON KABUSHIKI KAISHA, Tokyo (JP)

(72) Inventor: Quang Tuan Pham, North Ryde (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 216 days.

(21) Appl. No.: 15/835,317

(22) Filed: Dec. 7, 2017

(65) Prior Publication Data

US 2019/0180107 A1  Jun. 13, 2019

(51) Int. Cl.
G06K 9/00 (2006.01)
G06T 7/194 (2017.01)
G06K 9/46 (2006.01)

(52) U.S. Cl.
CPC .......... *G06K 9/00718* (2013.01); *G06T 7/194* (2017.01); *G06K 9/4652* (2013.01); *G06K 2209/015* (2013.01)

(58) Field of Classification Search
CPC .. G06K 9/00; G06K 9/00221; G06K 9/00979; G06K 9/00228; G06K 9/00362; G06K 9/00369; G06K 9/00993; G06K 9/3241; G06K 9/00718; G06T 7/00;

(Continued)

(56) References Cited

U.S. PATENT DOCUMENTS

| 6,970,083 B2 | 11/2005 | Venetianer et al. |
| 8,391,547 B2 | 3/2013 | Huang et al. |
| 9,996,752 B2 * | 6/2018 | Pham ........................ G06T 7/11 |

(Continued)

OTHER PUBLICATIONS

Yu Huang, et al.; "Players and Ball Detection in Soccer Videos Based on Color Segmentation and Shape Analysis. In Multimedia Content Analysis and Mining"; International Workshop, MCAM 2007, Weihai, China, Jun. 30-Jul. 1, 2007, Proceedings, Proceedings from Multimedia Content Analysis and Mining, International Workshop, Weihai, China, Jun. 2017; Nicu Sebe, Yuncai Liu, Yueting Zhuang, Thomas S. Huang, Ed. springer: Weihai, China, Jun. 2007; pp. 416-425.

(Continued)

*Primary Examiner* — Duy M Dang
(74) *Attorney, Agent, or Firm* — Canon USA, Inc., IP Division

(57) ABSTRACT

A method of detecting background pixels in a video, the video including a sequence of frames, each frame having a pitch and people. The method includes segmenting the pitch and determining a height of one of the people. An inclusion mask for the sequence of frames is then created using the pitch segmentation and the people's height. Each of the sequence of frames is segmented into foreground and background pixels. The method then creates a foreground appearance model from the foreground pixels inside said inclusion mask over the sequence of frames, and a background appearance model from the background pixels inside said inclusion mask over the sequence of frames. The method then uses the created foreground and background appearance models to segment one of the sequence of frames into definite foreground, definite background and uncertain pixels.

26 Claims, 11 Drawing Sheets

(58) Field of Classification Search
CPC ... G06T 7/194; G06T 7/215; G06T 7/10; G06T 7/11; G06T 7/12; G06T 7/20; G08B 13/19602
See application file for complete search history.

(56) References Cited

U.S. PATENT DOCUMENTS

2005/0271273 A1   12/2005  Blake
2019/0005652 A1*  1/2019  Pham ..................... G06T 7/194

OTHER PUBLICATIONS

Catrsten Rother, et al.; "GrabCut Interactive Foreground Extraction using Iterated Graph Cuts"; In ACM Transactions on Graphics, 23(3), Proceedings from SIGGRAPH 2004, LosAngeles, Aug. 2004; ACM: LosAngeles, Aug. 2004, six pages.

* cited by examiner

COLOUR LOOK-UP TABLE FOR BACKGROUND SEGMENTATION OF SPORT VIDEO

FIELD OF INVENTION

The present disclosure relates to video segmentation and, in particular, to a method, apparatus and system for background culling of a sporting scene. The present disclosure also relates to a computer program product including a computer readable medium having recorded thereon a computer program for background culling of a sporting scene.

BACKGROUND

A video is a sequence of images. The images may also be referred to as frames. The terms 'frame' and 'image' are used interchangeably throughout this specification to describe a single image in an image sequence, or a single frame of a video.

An image is made up of pixels where each pixel is represented by one or more values representing the visual properties at that pixel. For example, in one scenario three (3) values are used to represent Red, Green and Blue colour intensity at the pixel. In another scenario, YCbCr values are used to represent the luma component and the chroma components at the pixel.

Scene modelling, which covers both background modelling and foreground modelling, involves modelling visual content of a scene, based on an image sequence depicting the scene. A usage of scene modelling is foreground segmentation by background subtraction. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background, through scene modelling of the non-transient background, and a differencing operation between that background and incoming frames of video. Foreground segmentation can be performed by using scene modelling and identifying portions of the modelled scene which are either moving, or recently changed/added, or both.

To model a scene captured by a video camera, for example, the content of a captured image is often divided into one or more visual elements, and a model of the appearance of each visual element is determined. A scene model may maintain a number of models for each visual element location, each of the maintained models representing different modes of appearance at each location within the scene model. Each of the models maintained by a scene model is known as "mode model" or "scene model". For example, there might be one mode model for a visual element in a scene with a light being on, and a second mode model for the same visual element at the same location in the scene with the light off.

The description of a mode model may be compared against the description of an incoming visual element at the corresponding location in an image of the scene. The description may include, for example, information (e.g., average intensity value, variance value, appearance count of the average intensity value, etc.) relating to pixel values or DCT coefficients. If the description of the incoming visual element is similar to one of the mode models, then temporal information about the mode model, such as age of the mode model, helps to produce information about the scene. For example, if an incoming visual element has the same description as a very old visual element mode model, then the visual element location can be considered to be established background. If an incoming visual element has the same description as a young/recent visual element mode model, then the visual element location might be considered to be background or foreground depending on a threshold value. If the description of the incoming visual element does not match any known mode model, then the visual information at the mode model location has changed and the location of the visual element can be considered to be foreground.

Depending on the scene modelling method, a visual element can refer to a single pixel, an M×N block of pixels or a group of connected pixels (also known as a superpixel). The visual element location can refer to the location of a single pixel, or the location of the top-left corner of each M×N block of pixels or the centroid location of the group of connected pixels. The description of the visual element may contain but not be limited to the average colour intensities observed at the visual element, and/or a set of texture measures around the visual element. In general, any set of features computed over the visual element can be used to describe the visual element.

Scene modelling maintains a number of mode models per visual element; each corresponding to a description of the visual element. Some of these mode models describe the non-transient part of the scene, also known as the background. Other mode models describe the transient part of the scene, also known as the foreground. A dynamic scene modelling method also updates these mode models using the visual properties of incoming images. This updating step ensures the scene model is up to date with the dynamic changes happening in the scene including but not limited to illumination changes, or permanent changes to the background content such as addition, removal or one-off movement of fixed objects.

In one scene modelling method, a mixture of Gaussian (MoG) modes is used to describe the intensity values at each pixel. Each Gaussian in the mixture is represented by an average y, a standard deviation a and a mixture weight ω. The mixture weight ω is proportional to the frequency of appearance of the corresponding intensity mode. The sum of all mixture weights for each MoG equals to one. At each pixel location, the incoming intensity is matched to all Gaussians in the mixture. If the distance between the incoming intensity I and the Gaussian mode is within 2.5 σ (standard deviation) of a Gaussian distribution $|I-\mu|\leq 2.5\sigma$, the incoming intensity is said to match the Gaussian mode. The incoming intensity I is then used to update all matched modes, where the amount of update is inversely proportional to how close I is to the mode average μ. This update scheme, which updates multiple modes at a time, is inefficient and can potentially bring two modes closer to each other to a point where the two modes have similar averages. Such converged modes result in waste of memory due to mode duplication. In general, three to five Gaussian modes are used to model a scene depending on scene dynamics. If each mode requires the three parameters (μ, σ, ω) in double-precision format, 9 to 15 floating-point values are required by the MoG in total for the respective 3 to 5 Gaussian modes.

A second scene modelling method, which uses a convolutional neural network (CNN), varies in architectures. In one example, a CNN includes two parts, a convolution network and a deconvolution network. The convolution network has a sequence of convolution layers of various sizes that extract features from an input frame and transform the frame into a multi-dimensional feature representation. In the deconvolution network, a sequence of convolution layers of various sizes produce a probability map from this multi-dimensional feature representation. The probability map has the same dimension as the input frame. The probability map indicates the probability of each pixel in the input frame being part of the foreground. Multiple filters perform convolution on each of the convolution layers. As a result, the amount of processing and memory required grow proportionally to the complexity of the CNN architecture. To reduce the area to check for foreground objects, a method utilises a user defined region of interest. When a moving object in the image overlaps with the user defined region, their scene modelling method designates the object as foreground. Generally, the region of interest occupies only a portion of the input frame. Thus, the amount of processing is reduced. However, this requires a user to input the region of interest, which is time consuming and limits the flexibility in handling input frames from non-stationary cameras.

To define region of interest automatically, a method uses a histogram technique to classify pixels in an input frame. The method uses two histograms, one for pitch colours and another for non-pitch colours. A number of training frames are used to populate the histograms. The pixels in the training frames are labelled either as pitch pixels or non-pitch pixels. The labelling process is performed manually or by using a semi-supervised method. Pixels labelled as pitch in the training frames are added to the pitch colour histogram. Whereas, pixels labelled as non-pitch are added to the non-pitch colour histogram. After the training, the probability function of a colour being part of a pitch becomes:

$$P(c \mid \text{pitch}) = \frac{H_{pitch}(c)}{\text{sum}(H_{pitch})}$$

Where $H_{pitch}(c)$ is the number of pixels with the colour c in the pitch histogram, and $\text{sum}(H_{pitch})$ is the total number of pixels in the pitch histogram.

Similarly, the probability function of a colour being non-pitch is:

$$P(c \mid \text{non\_pitch}) = \frac{H_{non\_pitch}(c)}{\text{sum}(H_{non\_pitch})}$$

Thus, a pitch pixel classifier to determine if a colour c is to be labelled as the pitch area becomes:

$$\frac{P(c \mid \text{pitch})}{P(c \mid \text{non\_pitch})} \geq \text{threshold}$$

Where threshold is user defined.

The pitch pixel classifier is used to determine the preliminary pitch area in an input frame. The method further refines the preliminary pitch area by applying a morphological opening operation to remove small false positive noise. Enclosed within the refined pitch area are black areas left by potential foreground objects. These black areas become the regions of interest that are further processed to extract foreground objects.

The pitch pixel classifier provides background culling to reduce the processing of the scene modelling method. However, as foreground objects have to be completely within the pitch area to form holes, foreground objects that intersect with the pitch area's boundary cannot be detected by the method.

None of the above mentioned methods can determine regions of interest fully automatically that also include all foreground objects on the pitch. To overcome these deficiencies, there is a need for a fast background culling method to determine regions of interest that include all foreground objects on a sporting pitch while using less resource than a scene modelling method, such as MoG or CNN.

SUMMARY

According to an aspect of the present disclosure, there is provided a method of detecting background pixels in a video, the video including a sequence of frames, each frame having a pitch and people, the method including: segmenting the pitch; determining a height of one of the people; creating an inclusion mask for the sequence of frames using the pitch segmentation and the people's height; segmenting each of the sequence of frames into foreground and background pixels; creating a foreground appearance model from the foreground pixels inside said inclusion mask over the sequence of frames, and a background appearance model from the background pixels inside said inclusion mask over the sequence of frames; and using the created foreground and background appearance models to segment one of the sequence of frames into definite foreground, definite background and uncertain pixels.

According to another aspect of the present disclosure, there is provided a non-transitory computer readable medium including a software application program that is executable by a processor, wherein the processor executes the software application program to perform a method of detecting background pixels in a video, the video including a sequence of frames, each frame having a pitch and people, the method including: segmenting the pitch; determining a height of one of the people; creating an inclusion mask for the sequence of frames using the pitch segmentation and the people's height; segmenting each of the sequence of frames into foreground and background pixels; creating a foreground appearance model from the foreground pixels inside said inclusion mask over the sequence of frames, and a background appearance model from the background pixels inside said inclusion mask over the sequence of frames; and using the created foreground and background appearance models to segment one of the sequence of frames into definite foreground, definite background and uncertain pixels.

According to another aspect of the present disclosure, there is provided a device including a processor and a memory, the memory including a software application program that is executable by the processor, wherein the processor executes the software application program to perform a method of detecting background pixels in a video, the video including a sequence of frames, each frame having a pitch and people, the method including: segmenting the pitch; determining a height of one of the people; creating an inclusion mask for the sequence of frames using the pitch segmentation and the people's height; segmenting each of the sequence of frames into foreground and background pixels; creating a foreground appearance model from the foreground pixels inside said inclusion mask over the sequence of frames, and a background appearance model from the background pixels inside said inclusion mask over the sequence of frames; and using the created foreground and background appearance models to segment one of the sequence of frames into definite foreground, definite background and uncertain pixels.

BRIEF DESCRIPTION OF THE DRAWINGS

One or more embodiments of the invention will now be described with reference to the following drawings, in which.

DETAILED DESCRIPTION INCLUDING BEST MODE

Figure 1:
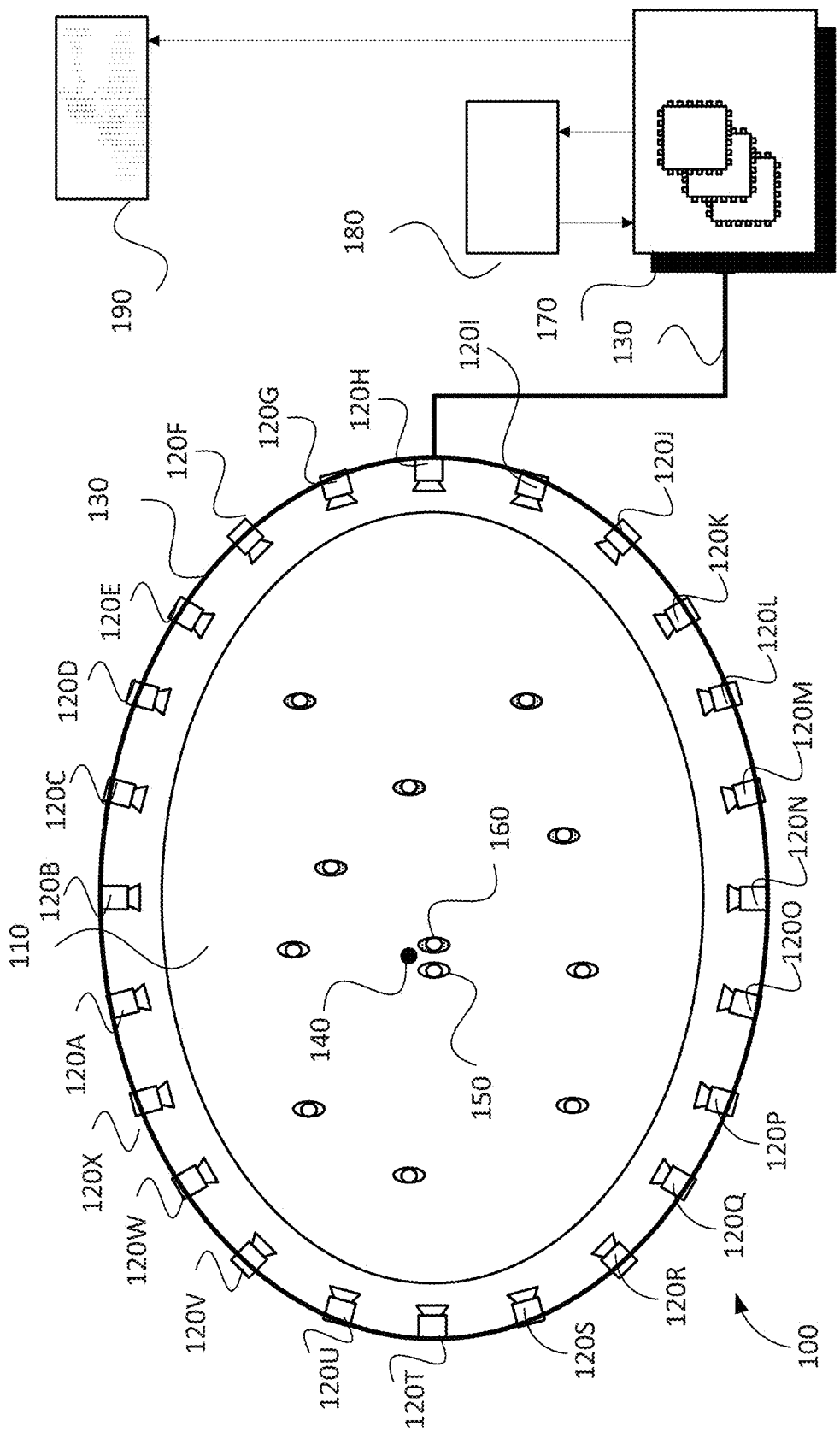
FIGS. 1, 2A and 2B collectively form a schematic block diagram representation of a camera system upon which described arrangements can be practiced.

A computer-implemented method of fast background culling is described below. The fast background culling method may be used to reduce a scene modelling method's processing time and memory requirement in processing a video comprising a plurality of images.

Context

The video may be captured using a network of cameras. The network of cameras may be set up around a region of interest (ROI), to capture live images of a scene within the ROI for broadcast. As described, the network of cameras may be part of a large computer vision system used to generate free viewpoint video (FVV). The FVV system is capable of processing video in real time and generating virtual video footage of the scene suitable for broadcast with a low latency.

The cameras may surround the ROI, for example, in one or more rings of cameras at different heights. The cameras may be evenly spread around the ROI or there may be a larger density of cameras at particular locations. Alternatively, the locations may be randomly spread. The cameras may be limited to locations on one side of the ROI, or limited due to the physical surrounding of the ROI.

As described below, the cameras are mounted and fixed. However, in alternative arrangements the cameras may be capable of pan, tilt and zoom (PTZ) and may be hand held and mobile. In order to produce FVV, the system may require either stabilised frames from the captured video or accurate calibration data associated with each frame. The data associated with each frame may include the effect of any temporal variation (e.g., white balance) in the camera capture. Such temporal variation in the camera capture may be either controlled (e.g. by an operator or some kind of automated control system) or may be due to mechanical or optical instability in a camera. The instability may include lens expansion/compression, vibrations, hand shake, or slow drifts such as due to environmental changes such as temperature, air pressure, wind, crowd motion, etc.

For example, a sports venue or stadium may have a large number of cameras (e.g., ten (10) or more cameras, or a hundred (100) or more cameras) with fixed PTZ directed towards a playing area. The playing area is often approximately rectangular, circular or oval, allowing the playing area to be surrounded by one or more rings of cameras so that all points on a field within the playing area are captured simultaneously from a large number of viewpoints. In some arrangements, a full ring of cameras may not be employed but rather some subset(s) of the full perimeter of cameras may be used. An arrangement where one or more subsets of the full perimeter of cameras are used may be advantageous when certain viewpoints are known to be unnecessary ahead of time.

As described below, the cameras are synchronised to acquire frames at the same instants in time. The cameras may be roughly set up at different heights (e.g. in three (3) rings at different heights) and may focus on specific pre-selected areas of the playing field. In one arrangement, the image features used for stabilisation may be line like field markings. The stabilisation methods being used should be robust to dynamic occlusions such as players moving on the field and crowd movements in stands surrounding the playing fields. The stabilisation methods should also handle periodic structures like parallel line markings.

In an alternative arrangement, the network of cameras described above may be configured to capture images of a stage at a performance venue. For example, a set of ten or more cameras may be directed in towards the stage from various directions in front of a performance. In such a stage arrangement, challenges may include changing scenery or equipment on the stage. The features in such a stage arrangement may be more varied than in a sports venue.

The cameras used in the camera network may be traditional live broadcast type cameras, digital video cameras, surveillance cameras, or other devices with imaging capability such as a mobile phone, tablet, computer with webcam, etc. As described below, methods described below are used for processing high definition (HD) video frames. However, all the methods described can be adapted to other frame formats such as standard definition (SD), 4K or 8K.

As described above, the described methods are adapted for use in the context of a sports or similar performance arena, such as arena 110 shown in FIG. 1. The arena 110 has an oval playing field, and is surrounded by a ring of cameras 120A-120X. Each of the cameras 120A-120X is physically located at a respective predetermined location with respect to the arena 110. The arena 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

Video frames captured by a camera, such as the camera 120A, are subject to processing and temporary storage at or near the camera 120A prior to being made available via a network connection 130 to a video processing unit 170. The video processing unit 170 receives controlling input from controller 180 that specifies the position of a virtual camera within the arena 110. The role of the video processing unit 170 is to synthesise a specified camera viewpoint 190 based on the video streams available to the video processing unit 170 from the cameras 120A-120X surrounding the arena 110.

The virtual camera position input may be generated by a human virtual camera operator and be based on input from a user interface device such as a joystick, mouse or similar controller including dedicated controllers comprising multiple input components. Alternatively, the camera position may be generated fully automatically based on analysis of game play. Hybrid control configurations are also possible where some aspects of the camera positioning are directed by a human operator and others by an automated algorithm. For example, coarse positioning may be performed by a human operator and fine positioning, including stabilisation and path smoothing, may be performed by an automated algorithm.

The video processing unit 170 may be configured to achieve frame synthesis using any suitable image based rendering method. In addition to rendering a requested frame, the video processing unit 170 may be additionally configured to perform synthesis, in-painting or interpolation of regions as required to create frames of high quality visual appearance. The video processing unit 170 may also be configured to provide feedback in the form of the frame quality or the completeness of camera coverage for the requested viewpoint so that the device generating the camera position control signal can be aware of the practical bounds of the video processing unit 170. Video streams created by the video processing unit 170 may be subsequently provided to a production desk where the video streams can be edited together to form a broadcast video.

Figure 2A:
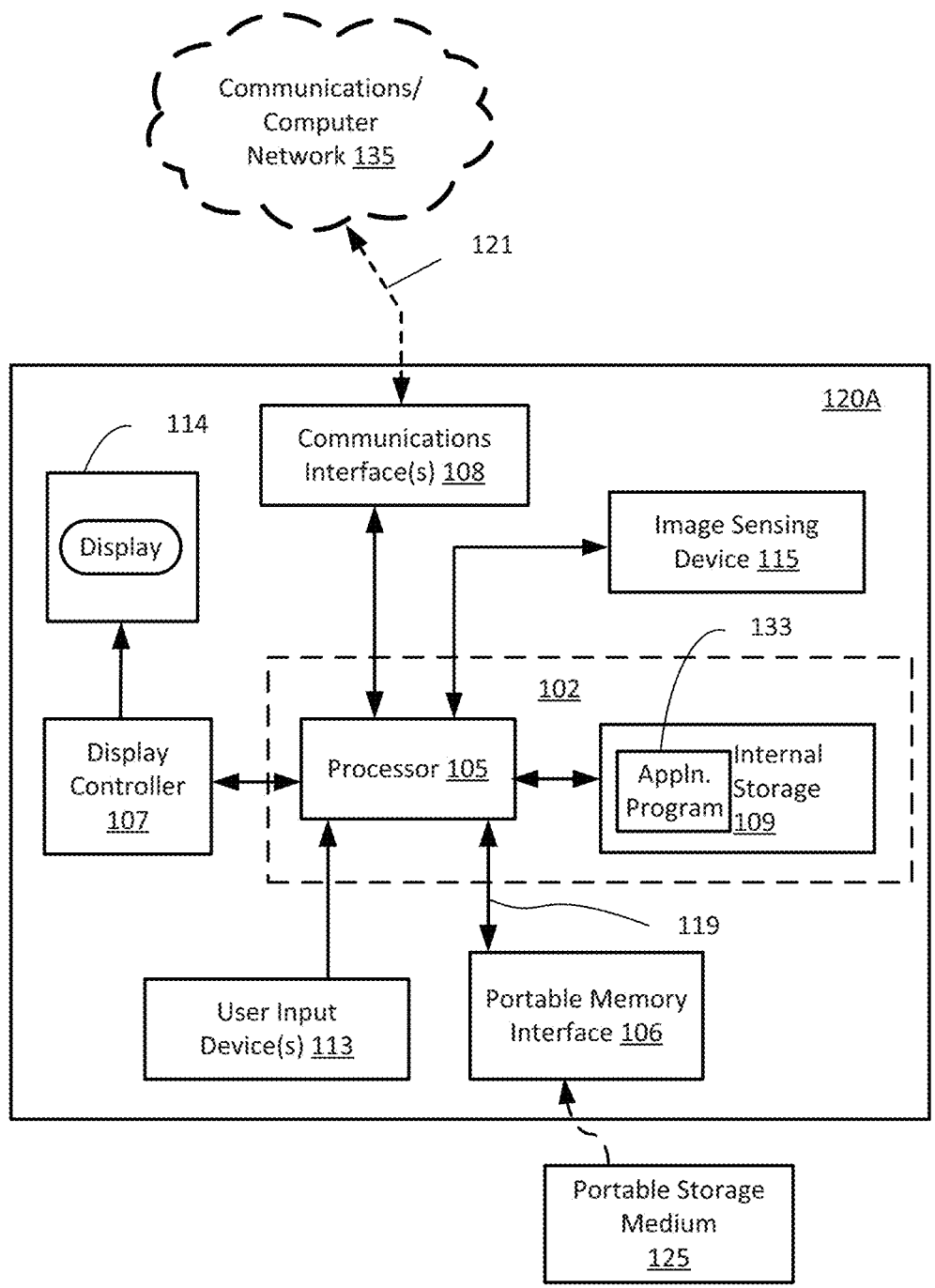
Figure 2B:
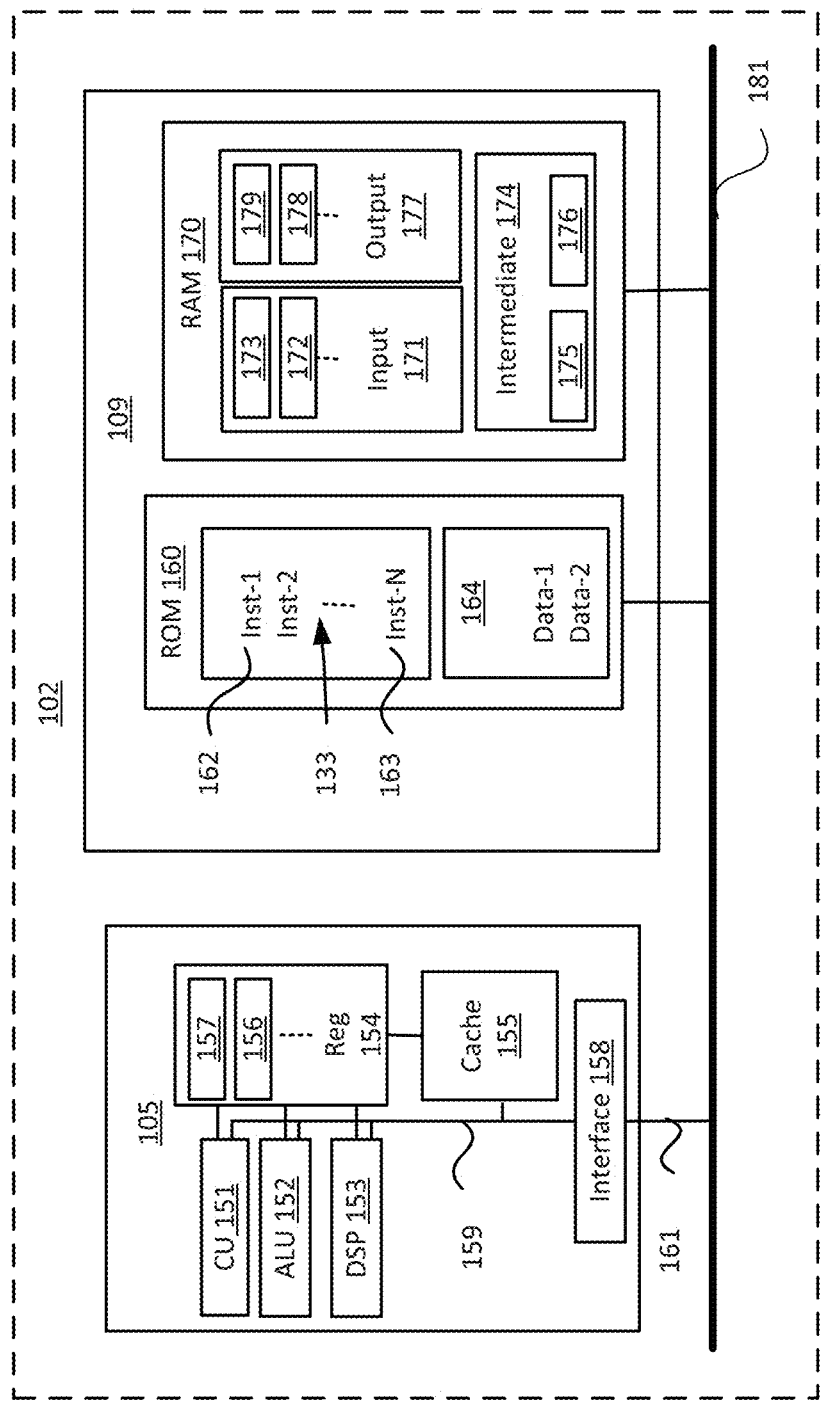

FIGS. 2A and 2B collectively form a schematic block diagram of a camera system forming the camera 120A. The other cameras 120B to 120X have a similar configuration to the camera 120 and, as such, will not be explicitly described.

The camera 120A includes embedded components, upon which methods of modifying a scene model to be described are desirably practiced. The camera 120A may be any suitable apparatus such as, for example, a digital camera or a mobile phone, in which processing resources are limited. One advantage of analysis at or near to the camera 120A, for example, is the potential for reduced latency. Nevertheless, the methods to be described may also be performed on higher-level devices such as desktop computers, server computers, and other such non-local processing unit devices with significantly larger processing resources.

Although the methods described below are described as being implemented on the camera 120A, the methods may be implemented on any one or more of the cameras 120B to 120X.

The camera 120A is used to capture input images representing visual content of a scene appearing in the field of view (FOV) of the camera 120A. Each image captured by the camera 120A comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

As seen in FIG. 2A, the camera 120A comprises an embedded controller 102. In the present example, the embedded controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2B. The RAM 170 may be volatile, non-volatile or a combination of volatile and non-volatile memory.

The camera 120A includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera 120A also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the camera 120A also comprises a portable memory interface 106, which is coupled to the processor 105 via a connection 119. The portable memory interface 106 allows a complementary portable memory device 125 to be coupled to the camera 120A to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera 120A also has a communications interface 108 to permit coupling of the camera 120A to a computer or communications network 135 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with an image sensing device 115, is provided to perform the functions of the camera 120A. The image sensing device 115 may include a lens, a focus control unit and an image sensor. In one arrangement, the sensor is a photo-sensitive sensor array. As another example, the camera 120A may be a mobile telephone handset. In this instance, the image sensing device 115 may also represent those components required for communications in a cellular telephone environment. The image sensing device 115 may also represent a number of encoders and decoders of a type including Joint Photographic Experts Group (JPEG), (Moving Picture Experts Group) MPEG, MPEG-1 Audio Layer 3 (MP3), H.264 (MPEG-4 Part 10 Advanced Video Coding) and the like. The image sensing device 115 captures an input image and provides the captured image as an input image.

The methods described below may be implemented using the embedded controller 102, where the processes of FIGS. 3 to 10 may be implemented as one or more software application programs 133 executable within the embedded controller 102. The camera 120A of FIG. 2A implements the described methods. In particular, with reference to FIG. 2B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 may be pre-installed and stored in the ROM 160 by a manufacturer, prior to distribution of the camera 120A. However, in some instances, the application programs 133 may be supplied to the user encoded on one or more CD-ROM (not shown) and read via the portable memory interface 106 of FIG. 1 prior to storage in the internal storage module 109 or in the portable memory 125. In another alternative, the software application program 133 may be read by the processor 105 from the network 135, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera 120A. Examples of transitory or non-tangible computer readable transmission media that may also participate in the provision of software, application programs, instructions and/or data to the camera 120A include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 2A. Through manipulation of the user input device 113 (e.g., the keypad), a user of the camera 120A and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera 120A is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera 120A. Typically, the application program 133 waits for events and subsequently executes the block of code associated with that event. Events may be triggered in response to input from a user, via the user input devices 113 of FIG. 2A, as detected by the processor 105. Events may also be triggered in response to other sensors and interfaces in the camera 120A.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera 120A.

A dynamic scene typically contains a fixed background and occasionally some moving objects in the foreground. The segmentation of these foreground objects from a background model is a task that is required by many applications. Most video analytics applications, for example, analyse the information about the foreground objects including but not limited to their sizes, shapes, moving directions, speeds, motion patterns and interactions. The segmented foreground and background model are also used by visualisation applications such as free-viewpoint video to synthesize new view.

Foreground segmentation from a video is often achieved using background modelling, or more generally, scene modelling, where the appearances of both the background (BG) and foreground (FG) are modelled. Scene modelling methods such as mixture of Gaussian (MoG) and convolutional neural network (CNN) take this approach.

Given that in a sport video, the background is typically fixed, a specialised background culling method can detect fixed background pixels more efficiently than scene modelling methods. Such background culling method may not be able to detect every background pixel. However, it can be used to remove a significant proportion of background pixels from the input frames before the input frames are passed on to a scene modelling method. This can significantly reduce the amount of work a scene modelling method has to perform. Thus, the system as a whole becomes more efficient.

Overview

In sport, foreground (FG) players often wear jerseys in different colour to the pitch to be stand out from the background (BG). Using this observation, a background colour culling method that classifies each RGB triplet as definite background, definite foreground, or uncertain colour can be used. For example, in a soccer match between a blue team and a red team on a green pitch, green can be definitely classified as background, while red and blue can be definitely classified as foreground. On the other hand, the classification of the colour white is uncertain since the colour white may appear in line markings as well as players' clothing.

The background colour culling method can be implemented using a background and a foreground colour histograms $H_{BG}$ and $H_{FG}$, respectively. For example, a colour triplet RGB is considered background if $H_{BG}(rgb) \gg H_{FG}(rgb)$, where $\gg$ is a significantly larger operation (for example, at least two-time larger). Similarly, a colour triplet RGB is considered foreground if $H_{FG}(rgb) \gg H_{BG}(rgb)$. The colour histograms are gathered from changed (FG) and unchanged (BG+stationary FG) pixels of the captured video. The histograms are populated by all frames during a training period. The histograms are then updated every N frames to handle global illumination changes (N can be smaller and the learning rate faster when sudden illumination change is detected).

The FG/BG pixel gathering can be obtained from previous frame FG/BG segmentation result (e.g. using a more costly method like Gaussian Mixture Model (GMM) on non-BG classified pixels). Alternatively, a simple three-frame differencing method can be used to get a rough FG/BG segmentation. Since the statistics is gathered over multiple frames, small FG/BG segmentation mistakes are glossed over.

In a typical scenario where the camera is pointing down on a stadium pitch, as much as 90% of pixels can be quickly classified as background by colour alone. The 10% of uncertain pixels (FG+missed BG) can be sent to adjacent cameras for stereo pair change detection. RGB values of the refined FG masks using adjacent camera pairs can then be sent to a central server for 3D FG player reconstruction.

Figure 3:
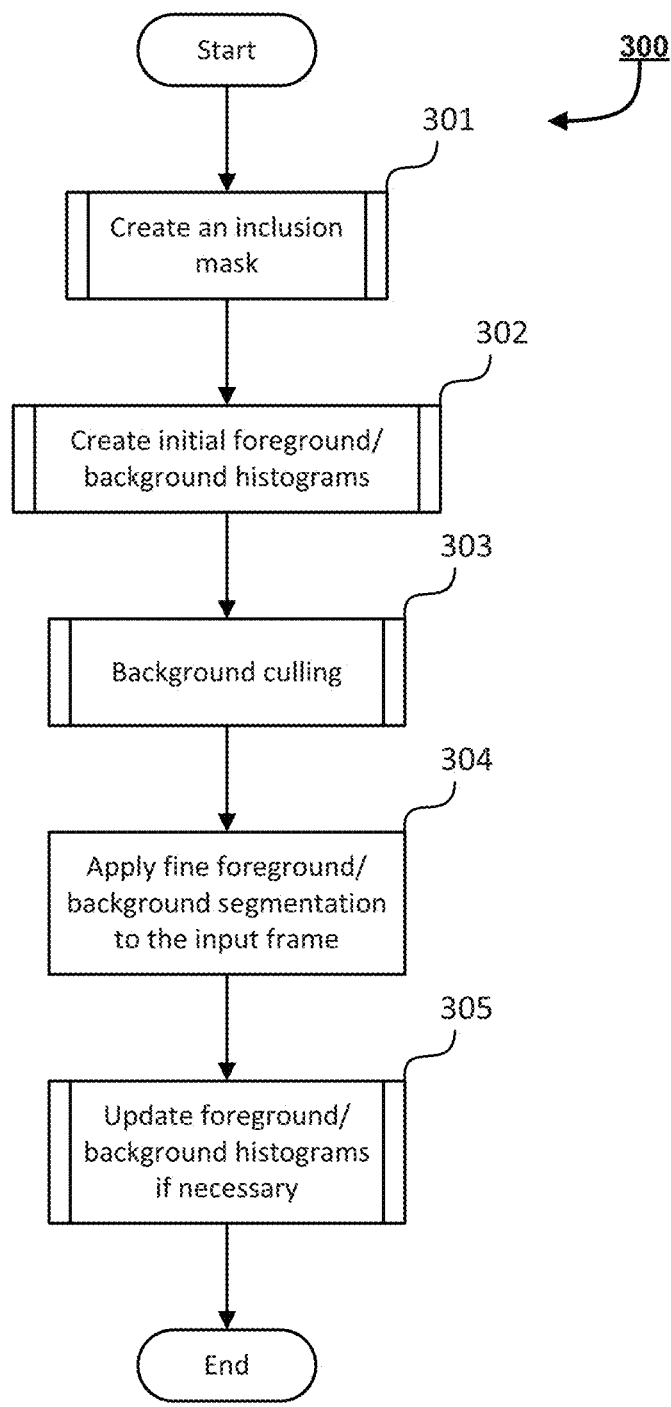
FIG. 3 is a schematic flow diagram showing a method of sporting pitch segmentation with background culling.

FIG. 3 is a schematic flow diagram showing a fast background culling method 300 coupled with a scene modelling method. The method 300 can be implemented as one or more software application programs 133 executable within the embedded controller 102.

The method 300 starts at sub-process 301, where the background culling method 300 creates an inclusion mask. The inclusion mask includes the entire visible sporting pitch in input frames and additional areas where foreground objects may be present. Sub-process 301 will be described in more detail hereinafter in relation to FIG. 4. The method 300 proceeds from sub-process 301 to sub-process 302.

At sub-process 302, the method 300 uses the inclusion mask to select pixels to create an initial foreground histogram and an initial background histogram. The inclusion mask is used to reduce the contribution of pixels in the stadium to the FG and BG histograms. During a professional sporting event, the stadium usually contains colours of the sporting theme. For example, if a sporting team wear red jerseys, their supporters would also likely dressed in red with red banners and flags. Excluding such colours from the background histogram improves the colour separability of the FG and BG histograms, leading to a better culling of BG pixels using colour information only.

Sub-process 302 will be described in more detail hereinafter in relation to FIG. 5. The method 300 then proceeds from sub-process 302 to step 303.

Then, at the culling step 303, the pixels in an input frame are classified as either background or potential foreground pixels. Background pixels are removed from the input frame for further processing purpose. The method 300 proceeds from step 303 to step 304.

At step 304, a scene modelling method is used to apply foreground/background segmentation on the culled input frame. The scene modelling method outputs a foreground mask. A foreground mask is a binary image, which has the same dimension as the input frame. A zero value for a foreground mask pixel indicates that the corresponding pixel in the image frame is a background pixel. Conversely, a non-zero value for a foreground mask pixel indicates that the corresponding pixel in the image frame is a foreground pixel. The method 300 proceeds from step 304 to step 305.

At step 305, the method 300 updates the histograms for every input frame, or as the need arises.

The sub-processes 301 and 302 represent the initialisation (or training) phase of the method 300. Steps 303 to 305 represent the running (or testing) phase of the method 300.

Embodiment 1

Figure 4:
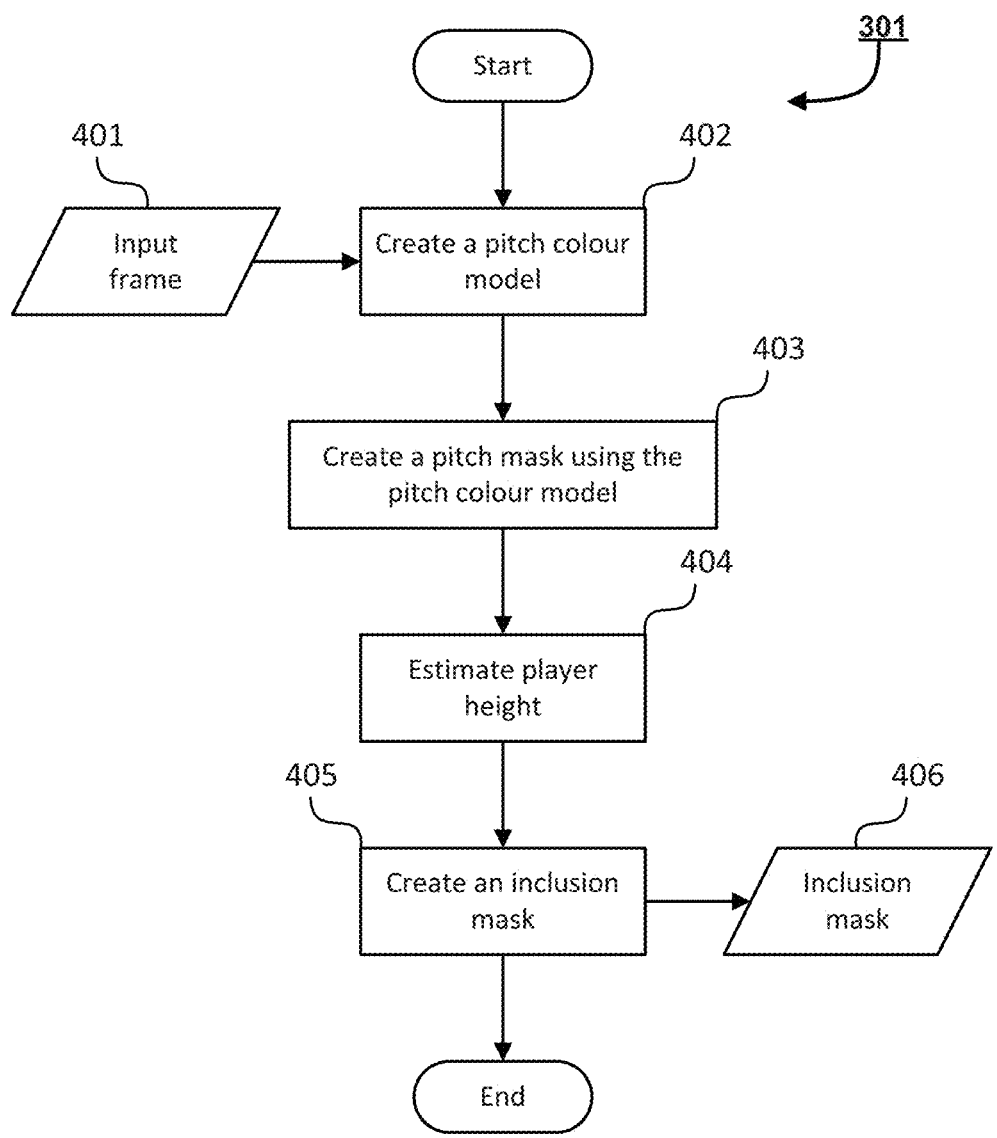
FIG. 4 is a schematic flow diagram showing an inclusion mask creation sub-process of the method of FIG. 3.
Figure 7A:
FIG. 7A shows a sample input frame.

The inclusion mask creation sub-process 301 is shown in FIG. 4. The sub-process 301 commences at step 402 where the sub-process 301 receives an input frame 401. An example of an input frame for soccer sport is shown in FIG. 7A. Step 402 proceeds to create a pitch colour model. The pitch colour model contains the dominant colours from low-textured pixels in the input frame. Low-textured pixels can be detected using methods such as normalised variance and normalised standard deviation. The low-textured pixels are then used to build a colour histogram. A dominant peak in the colour histogram indicates the dominant colour of the pitch. To make the pitch colour model shadow invariant, other shades of the dominant colour representing the lit and shadow colours of the pitch are also selected from the remaining histogram peaks. The multiple shades of the same pitch colour must be compatible under the same illumination sources. For example, the varying shades of green of a grass pitch usually lie along a lit-shadow colour line in the RGB colour space. The lit-shadow colour line may go through the origin (R=G=B=0) in the case of panchromatic lighting (i.e. white light sources). However, the lit-shadow colour line may also not go through the origin under dichromatic light sources such as the white sun and blue sky for outdoor sport during daytime. Other pitch colour models that handle multiple shades of a dominant pitch colour under different lighting conditions can also be used. Thus, the pitch colours can be determined without prior knowledge. The sub-process 301 proceeds from step 402 to step 403.

Figure 7B:
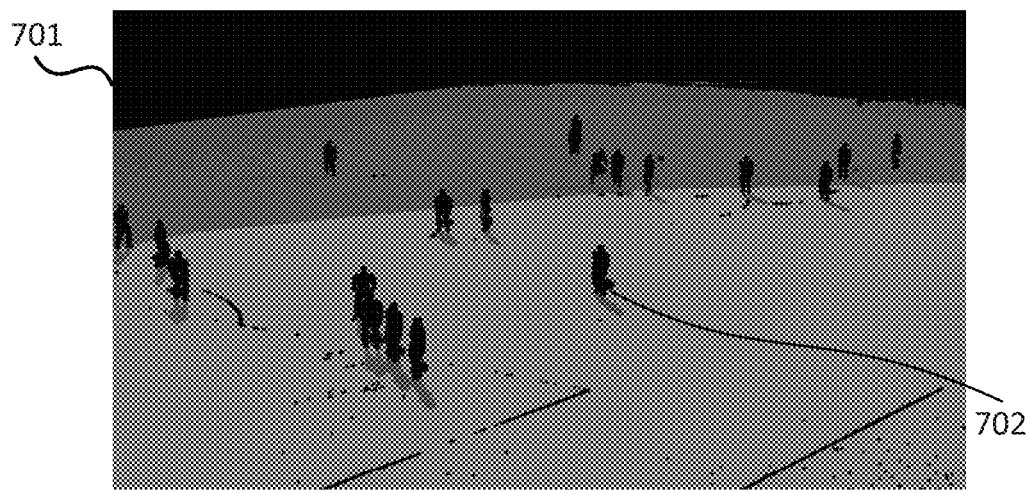
FIG. 7B shows a sample input frame with a pitch mask overlay.

At step 403, based on the pitch colour model created at step 402, a pitch mask is created. A pitch mask is a binary image with the same dimension as the input frame 401. A zero value is assigned to a pitch mask pixel if the corresponding pixel in the input frame 401 is considered to be of non-pitch colour. A non-zero value is assigned to a pitch mask pixel if the corresponding pixel in the input frame 401 has one of the pitch colours. The pitch mask represents the regions where the pitch is visible in the input image. An example of a pitch mask is shown in FIG. 7B. Different shades of grey (excluding the black colour 701) represent different shades of the detected pitch colour. Potential foreground objects on the pitch, such as an object 702, may appear as black areas in the pitch mask. Regions outside the convex hull of the pitch mask may contain field boundary and/or stadium. The sub-process 301 proceeds from step 403 to step 404.

At step 404, the black areas in the pitch mask are used to estimate players' heights. Connected component analysis can be used to determine the dimension of the black areas in the pitch mask. Only black objects with certain aspect ratio should be considered to represent a player. Once the black areas associated with players are identified, a maximum player's height is calculated. In some sports with a small pitch (e.g. sumo wrestling), there may be no black areas in the pitch mask since players may not fully lie inside the pitch. In such cases, a partial foreground mask is created by an XOR operation on the pitch mask and its convex hull. This partial foreground mask usually contains lower parts of the players as they stand on the pitch. An average player's width can be determined from these lower parts of foreground players. An average player's height can be determined from the average player's width using a fixed aspect ratio relationship (e.g. person's height=3*person's width). The maximum player's height can always be updated once there are more players in the scene during the match. In one alternative arrangement, the player's height is determined by retrieving an average height of a person from the memories 160 and 170. In the alternative arrangement, the average height of a person is manually entered. The sub-process 301 proceeds from step 404 to step 405.

Figure 7C:
FIG. 7C shows a sample input frame with an inclusion mask overlay.

Then at step 405, the pitch mask is morphologically closed to fill player's black areas and dilated upwards by the maximum player's height (or the retrieved average person's height) to form an inclusion mask 406. The inclusion mask 406 is automatically generated once for the input frame 401 and reused for any subsequent frame as long as the camera stays static. A noticeable movement of the camera can trigger a recomputation of the pitch mask and the inclusion mask. However, the pitch colour model can be reused if there is no significant illumination change. The maximum player's height can also be reused if the camera does not zoom in or out. An example of an inclusion mask overlaid on top of the input frame 401 is shown in FIG. 7C. The upward dilated region 703 in the inclusion mask can cover players standing at the top edge of the pitch. In other words, the inclusion mask is dilated by the player's height (or the retrieved average person's height) at the top edge of the pitch. Without the player's height estimation and the dilation operation, players standing at the edge of the pitch would be excluded. The sub-process 301 concludes at the conclusion of step 405.

Figure 5:
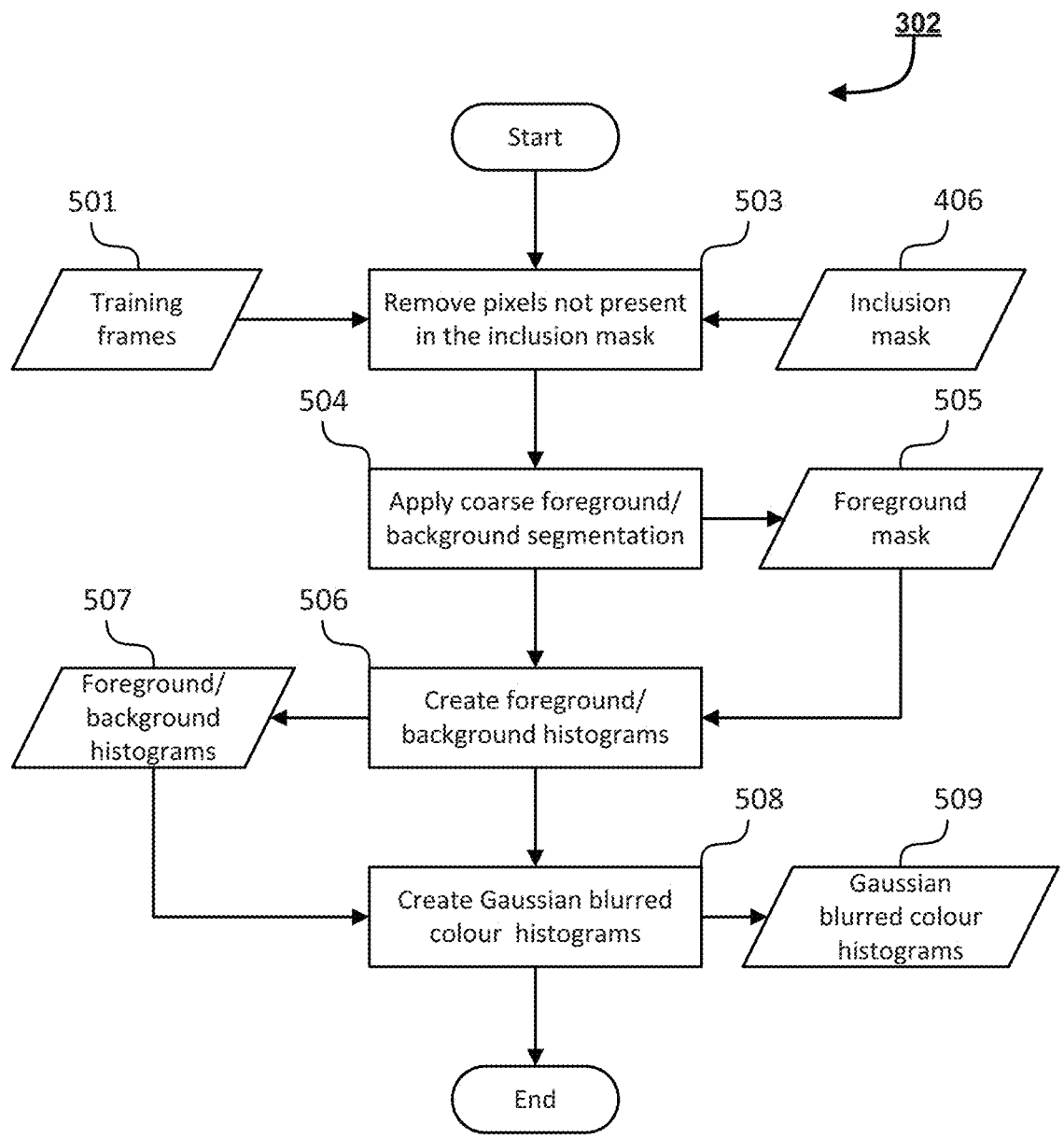
FIG. 5 is a schematic flow diagram showing an initial foreground/background histograms creation sub-process of the method of FIG. 3.
Figure 6:
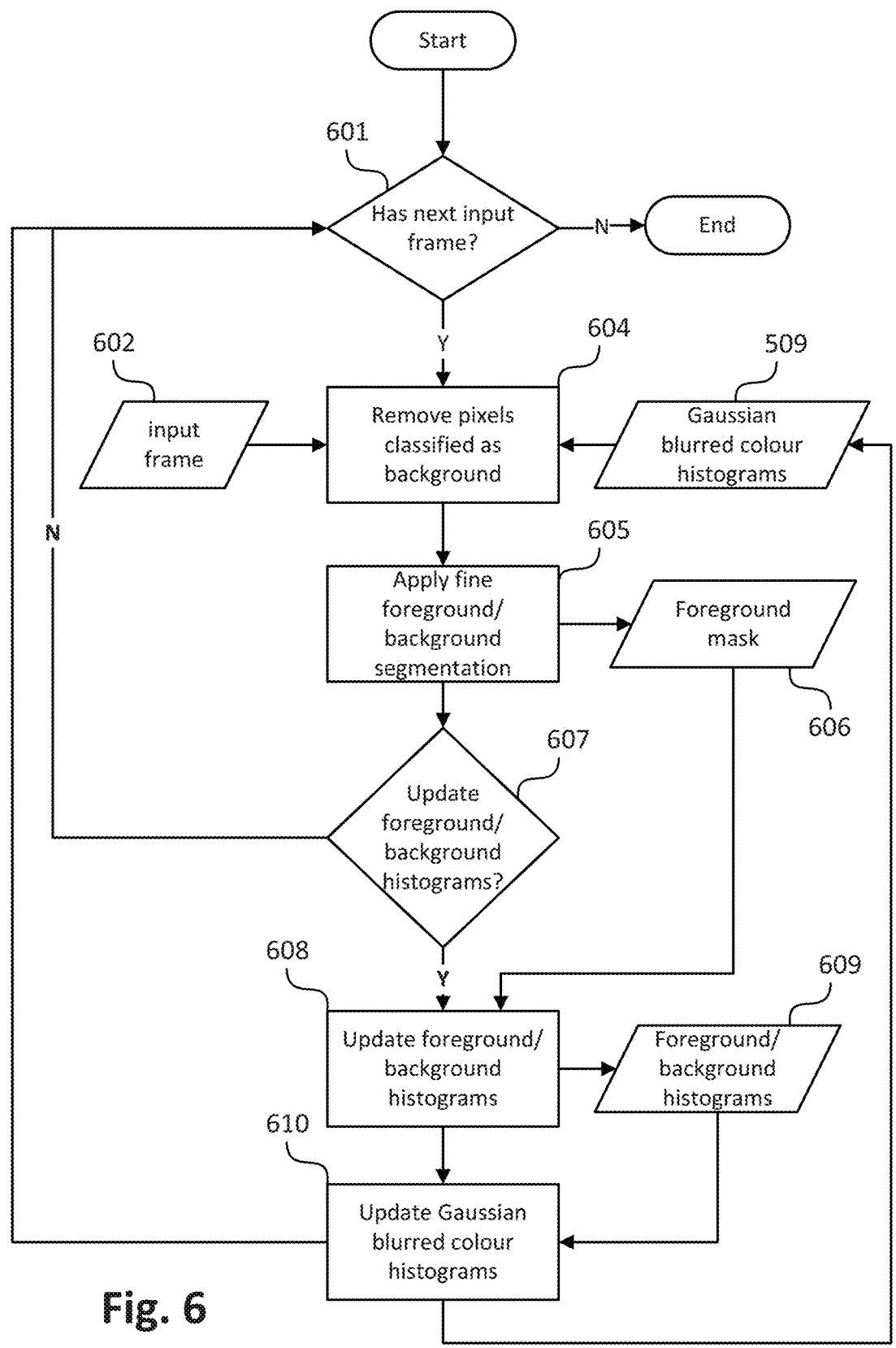
FIG. 6 is a schematic flow diagram showing the processes of background culling, foreground/background segmentation to an input frame, and foreground/background update of the method of FIG. 3.

The creation of the initial foreground and background histograms in sub-process 302 is shown in FIG. 5. The sub-process 302 commences at step 503 where the method receives a number of training frames 501 and the inclusion mask 406. Step 503 removes pixels from the training frames 501 where the corresponding pixel value in the inclusion mask 406 is zero. The remaining pixels are in the visible pitch area and the extended region 703 (see FIG. 7C). Sub-process 302 proceeds from step 503 to step 504.

Then at step 504, a coarse foreground/background segmentation is performed to classify the remaining pixels into foreground pixels and background pixels. This classification does not require high accuracy and, thus, can be performed quickly. An example of a coarse foreground/background segmentation method is a three-frame differencing change detection method, which is briefly described as follows. Three training frames, $I_1$, $I_2$ and $I_3$, a few frames apart, from a video sequence are selected. The separation between the training frames is to have foreground objects to show small movement between the training frames. Then, the absolute pixel value difference between $I_1$ and $I_2$, and $I_2$ and $I_3$ are calculated to produce two difference maps $|I_1-I_2|$ and $|I_2-I_3|$. A user defined threshold $T_{cd}$ is applied to each difference map to create a change mask (e.g. $T_{cd}=15$ for unsigned 8-bit intensities). The two change masks are combined using the bitwise AND operation to form a foreground mask 505 to be used at step 506. The bitwise AND operation is used to detect pixels that appear in both change masks. These pixels more likely correspond to moving objects in the middle frame $I_2$. Other methods such as optical flow estimation, HOG (histogram of gradients) person detection, or R-CNN (regional convolutional neural networks) object detection can also be used for coarse foreground/background segmentation.

During the coarse FG/BG segmentation, some BG colours may inadvertently leak into the FG histogram. For example, moving shadow pixels are likely detected as change and therefore contribute to the FG histogram. Similarly, some FG colours may inadvertently leak into the BG histogram such as the colours of temporarily stationary FG object. However, as long as these incorrectly attributed colours appear less frequently than the correctly attributed colours during an extended training period, the produced FG and BG histograms can still be used to correctly separate background colours from foreground colours. To reduce the inadvertent colour leakage, known background colours that do not appear in the foreground such as shadow and half-shadow colours from the pitch colour model in step 402 can be relabelled as BG during training.

The foreground histogram is also referred to as the foreground appearance model. Similarly, the background histogram is referred to as the background appearance model. Sub-process 302 proceeds from step 504 to step 506.

At step 506, the foreground mask 505 is used to classify the remaining pixels into foreground pixels and background pixels. Foreground pixels are used to accumulate a foreground colour histogram. Background pixels are used to accumulate a background colour histogram. The number of dimension of the histograms depends on the colour space used.

Figure 8:
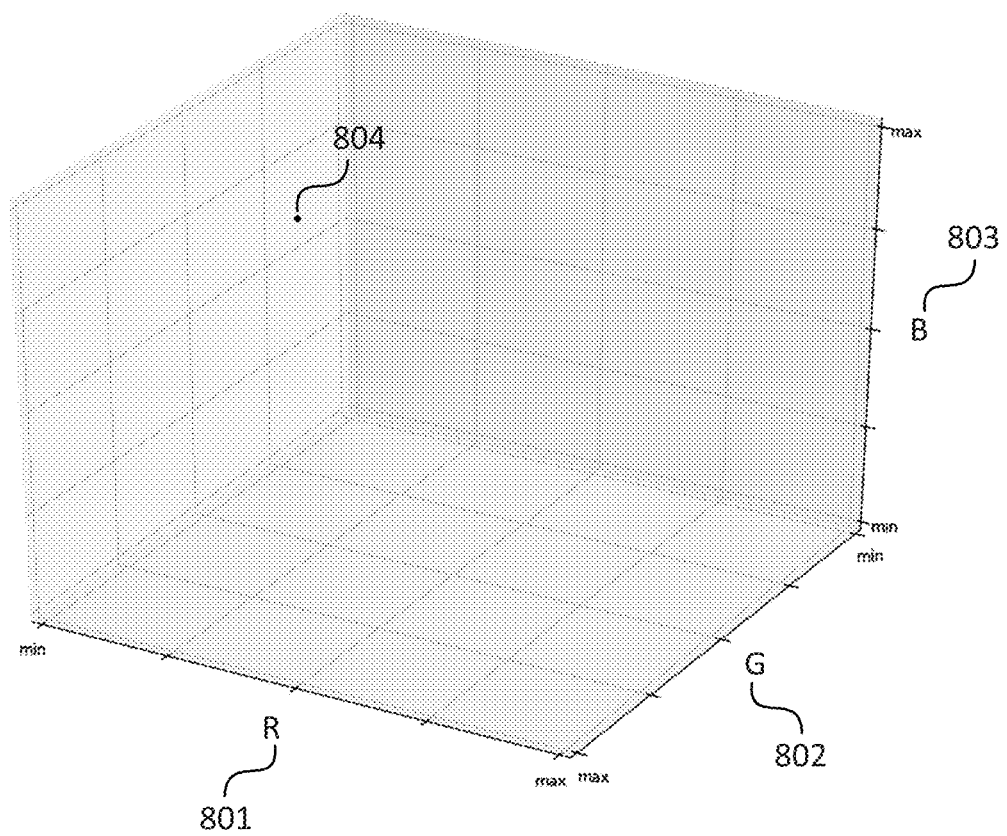
FIG. 8 shows an example of an RGB colour histogram.

FIG. 8 shows an example of a histogram where the colour space is RGB. The histogram has 3 axis, 801, 802 and 803 for red, green and blue channels respectively. For other colour spaces, the histograms are arranged accordingly. A bin 804 in the histogram can represent a single RGB value, or in the case of quantisation, a range of values within the colour channels. The accumulated histograms 507 are thus initialised. Sub-process 302 proceeds from step 506 to step 508.

At step 508, a pair of Gaussian blurred colour histograms 509 are created from the foreground and background histograms 507, one for foreground and another for background. The Gaussian blurred colour histograms 509 are used to classify pixels as foreground or background. To create the Gaussian blurred colour histograms 509, a Gaussian blur operation is applied to both foreground and background histograms 507. The 3D colour histograms can be blurred by a one-dimensional FIR (finite impulse response) Gaussian filter, applied separably along each dimension. The FIR filter has a finite number of taps to limit the spreading of the histogram count from one bin to its neighbours. For a filter with a small Gaussian blur width σ=1, a typical FIR filter contains 7 taps, which truncates the Gaussian at three sigmas. Normalisation is then applied to the blurred histograms. The normalised histograms become Gaussian blurred colour histograms 509. Sub-process 302 concludes at the conclusion of step 508.

The running phase of the method 300 includes steps 303 to 305, as described above and is shown in FIG. 6. The running phase begins at step 601, where the running phase checks the availability of the next input frame. If the end of a video sequence is reached (N), the running phase ends. Otherwise (Y), the running phase proceeds to step 604.

At step 604, for each pixel in an input frame 602, its colour is compared with the Gaussian blurred colour histograms 509. The comparison returns two probability values, $Pr_{FG}$ and $Pr_{BG}$, from the foreground and background Gaussian blurred colour histograms 509, respectively. This use of Gaussian blurred normalised colour histograms 509 is different from conventional arrangements, which use the raw normalised histograms of pitch and non-pitch as the probability of a colour being either pitch or non-pitch.

A pixel is classified as definite background if the following condition is true:

$$\frac{Pr_{BG}}{Pr_{FG}} > \text{threshold}$$

Where threshold is user defined, with typical value being 1. Similarly, pixels whose $$\frac{Pr_{FG}}{Pr_{BG}} > T_{FG},$$

where $T_{FG}=2$, for example, can be classified as definite foreground. Pixels whose colours are neither definite background nor definite foreground are called uncertain pixels. The classification of uncertain pixels cannot be determined based on colour alone. A fine FG/BG segmentation method 605 is therefore required to make this final classification.

The blurring provides some probability measurement for unseen colours that are close to previously seen colours in the training dataset. As a result, an unseen colour can be classified as more likely background than foreground if it is closer to strong BG histogram bins than FG histogram bins, and vice versa.

Background pixels are then culled from the input frame 602. Therefore, step 604 is one arrangement of step 303 of the method 300. The running phase proceeds from step 604 to step 605.

Figure 9A:
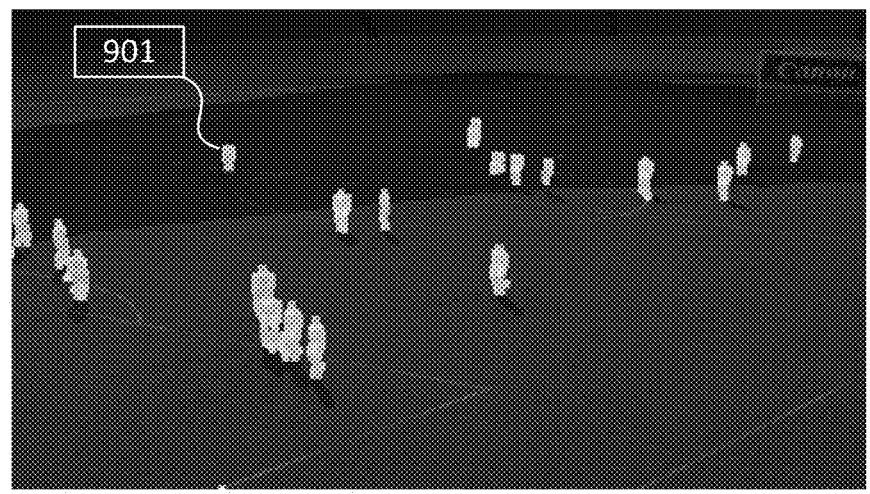
FIGS. 9A, 9B, and 9C show a sample input frame with a foreground mask overlay.

At step 605, a scene modelling method performs fine foreground/background segmentation on the culled input frame. The scene modelling method outputs a foreground mask 606. An example of a foreground mask 901 overlay on top of the input frame is shown in FIG. 9A. Therefore, step 605 is step 304 of the method 300. The running phase proceeds from step 605 to step 607.

Then, at step 607, it is determined whether the foreground and background histograms are to be updated. If YES, the running phase proceeds to step 608. For example, the update can be instigated at a predetermined period of time (e.g., 1 second, 60 seconds, etc.).

Otherwise (NO), the running phase returns to step 601.

At step 608, the foreground mask 606 produced at step 605 is used to classify the input frame pixels into foreground and background pixels. Foreground pixels are used to update the foreground histogram. Background pixels are used to update the background histogram to create an updated foreground and background histograms 609. The running phase then proceeds from step 608 to step 610.

At step 610, the updated foreground and background histograms 609 are used to update the Gaussian blurred colour histograms 509. After the update, the running phase returns to step 601. Therefore, steps 607 to 610 relate to step 305 of the method 300. As described above, the running phase concludes if there is no more input frame to process.

Embodiment 2

Some scene modelling methods do not accept background culled input images. Instead, these scene modelling methods accept fixed dimension regions of interest. In another aspect, the background classification can be used to propose regions of interest to scene modelling methods.

Figure 10:
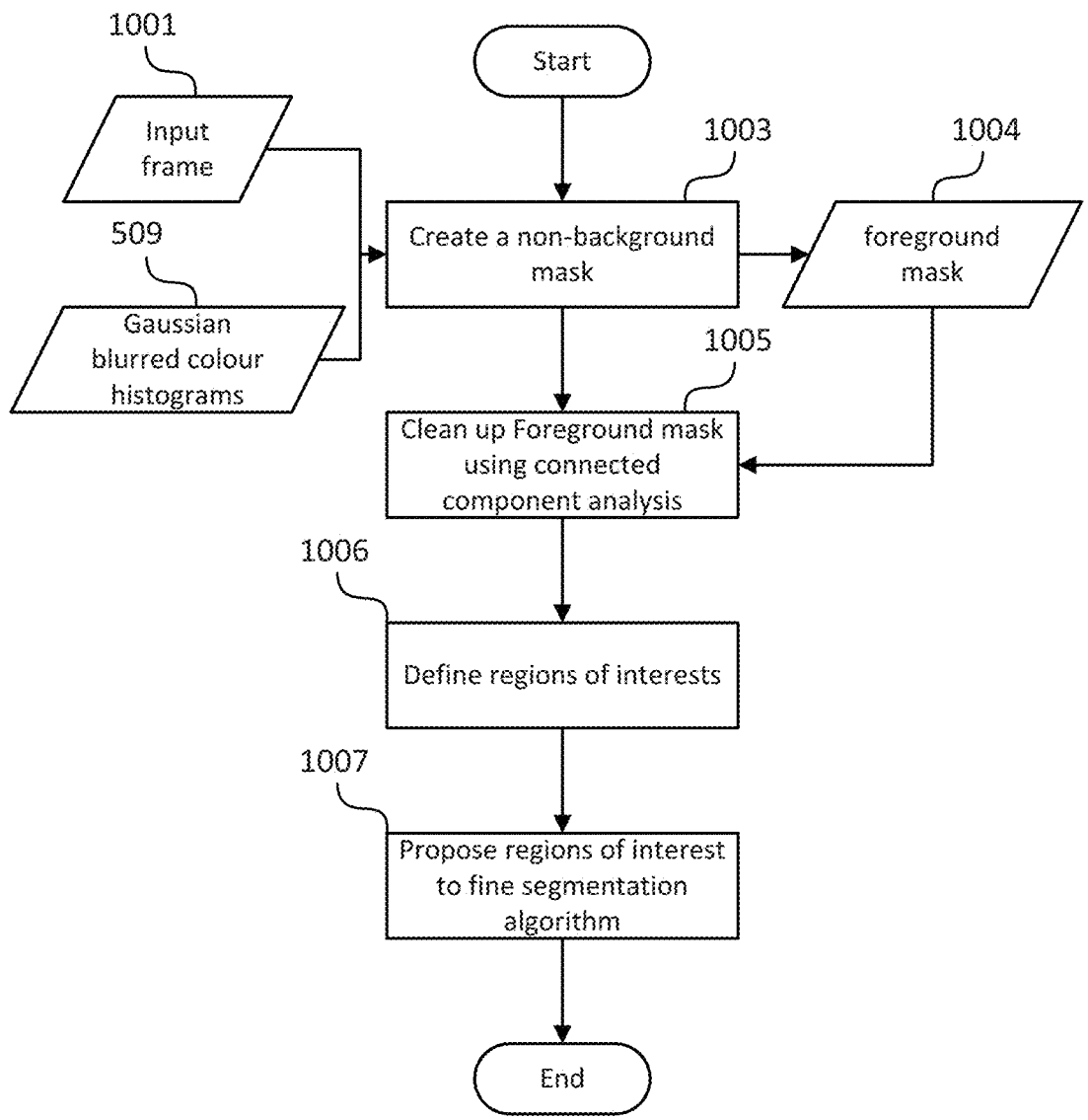
FIG. 10 is a schematic flow diagram showing a method to provide regions of interest to a fine foreground/background segmentation algorithm.

FIG. 10 shows an alternative arrangement of step 303. The alternative arrangement of step 303 replaces step 604 of the running phase of the method 300.

In the alternative arrangement, step 303 provides regions of interest to a scene modelling method. The alternative step 303 starts at step 1003, where background classification on an input frame 1001 using the Gaussian blurred colour histograms 509 (which is generated by sub-process 302). The classification is then used to create a foreground mask 1004. Step 303 proceeds from step 1003 to step 1005.

At step 1005, connected component analysis is performed on the foreground mask 1004 to identify foreground objects. The foreground objects must meet a minimum size and an aspect ratio requirement to fit the description of a player or a play object (e.g. a ball). This removes noise from the foreground mask 1004. Step 303 proceeds from step 1005 to step 1006.

Figure 9B:
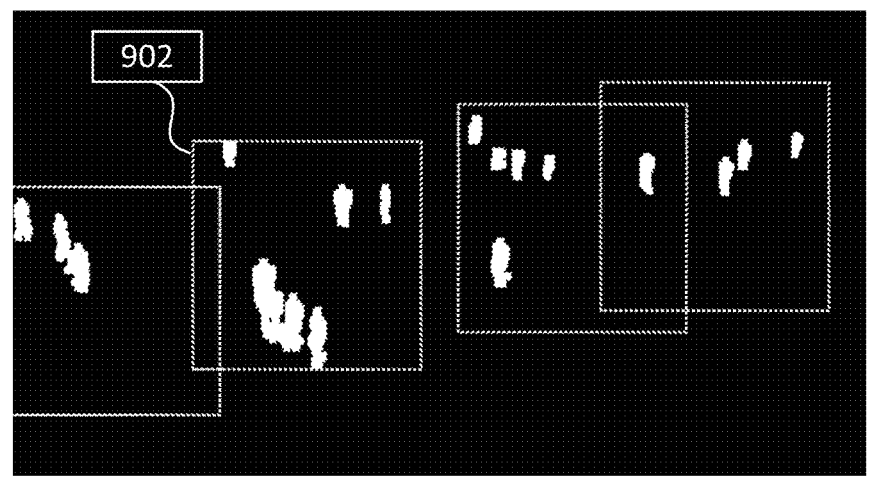
Figure 9C:
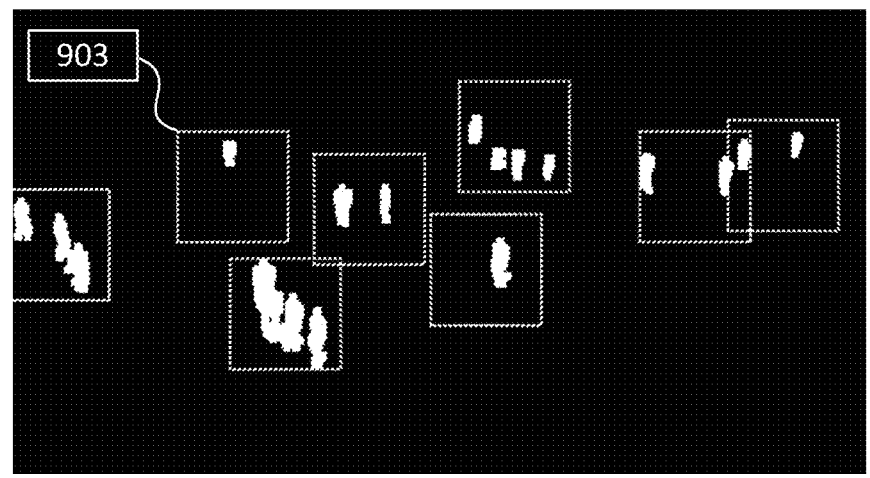

At step 1006, step 303 defines regions of interest that enclose all detected foreground objects. The regions of interest are defined such that they meet the dimension requirement from the scene modelling method. For example, some CNN segmentation methods prefer input regions of interest to be of certain size such as 256×256 pixels. An example of such auto-generated region of interest is shown in FIG. 9B. Note that the proposed regions 902 (shown as dotted bounding boxes of equal size) together cover all the non-background pixels 901. The proposed regions may overlap. Another example of region proposals with a smaller bounding box size is shown in FIG. 9C. Despite some overlap, the total area of the proposed regions 903 are significantly smaller than the area of the whole image. As a result, significant speedup is achieved compared to running a fine FG/BG segmentation algorithm over the whole image. Step 303 proceeds from step 1006 to step 1007.

At step 1007, the regions of interest are provided to the scene modelling method to produce a fine foreground/background segmentation. Alternative step 303 concludes at the conclusion of step 1007. The regions of interest are used by step 605 to produce the fine foreground/background segmentation.

INDUSTRIAL APPLICABILITY

The arrangements described are applicable to the computer and image processing industries.

The foregoing describes only some embodiments of the present invention, and modifications and/or changes can be made thereto without departing from the scope and spirit of the invention, the embodiments being illustrative and not restrictive.

The claims(s) defining the invention are as follows:

1. A method of detecting background pixels in a video, the video comprising a sequence of frames, each frame having a pitch and people, the method comprising:
   segmenting the pitch;
   determining a height of one of the people;
   creating an inclusion mask for the sequence of frames using the pitch segmentation and the people's height;
   segmenting each of the sequence of frames into foreground and background pixels;
   creating a foreground appearance model from the foreground pixels inside said inclusion mask over the sequence of frames, and a background appearance model from the background pixels inside said inclusion mask over the sequence of frames; and
   using the created foreground and background appearance models to segment one of the sequence of frames into definite foreground, definite background and uncertain pixels.

2. The method according to claim 1, wherein the pitch is segmented based on a pitch colour model that comprises multiple shades of a dominant pitch colour under different lighting conditions.

3. The method according to claim 1, wherein a three-frame differencing change detection method is used to segment each of the sequence of frames into the foreground and background pixels.

4. The method according to claim 1, wherein a change detection method based on optical flow estimation is used to segment each of the sequence of frames into the foreground and background pixels.

5. The method according to claim 1, wherein a foreground detection method based on regional convolutional neural networks (R-CNN) object detection is used to segment each of the sequence of frames into the foreground and background pixels.

6. The method according to claim 1, wherein shadows cast on the pitch are classified as the background pixel irrespective of a change detection status of the shadows.

7. The method according to claim 1, wherein the foreground appearance model is a foreground histogram accumulated from the foreground pixels and wherein the background appearance model is a background histogram accumulated from the background pixels.

8. The method according to claim 7, further comprising creating Gaussian blurred colour histograms of the foreground and background pixels based on the foreground histogram and the background histogram.

9. The method according to claim 8, further comprising determining a probability of whether a particular colour belongs to the foreground or background based on the Gaussian blurred colour histograms.

10. The method according to claim 9, wherein a pixel is determined as definite background if the probability of the pixel's colour being background is significantly larger than the probability of the pixel's colour being foreground, and a pixel is determined as definite foreground if the probability of the pixel's colour being foreground is significantly larger than the probability of the pixel's colour being background.

11. The method according to claim 1, wherein the inclusion mask is created by dilating the pitch segmentation upward by the people's height.

12. The method according to claim 1, wherein the foreground appearance model and the background appearance model are updated based on a predetermined period of time or a predetermined number of frames.

13. The method according to claim 8, further comprising:
   creating a foreground mask based on the Gaussian blurred colour histograms;
   defining at least one region of interest that covers the foreground pixels of the foreground mask; and
   further segmenting the at least one region of interest into background and foreground.

14. The method according to claim 1, wherein the people's height is determined by retrieving an average height of a person.

15. A non-transitory computer readable medium comprising a software application program that is executable by a processor, wherein the processor executes the software application program to perform a method of detecting background pixels in a video, the video comprising a sequence of frames, each frame having a pitch and people, the method comprising:
- segmenting the pitch;
- determining a height of one of the people;
- creating an inclusion mask for the sequence of frames using the pitch segmentation and the people's height;
- segmenting each of the sequence of frames into foreground and background pixels;
- creating a foreground appearance model from the foreground pixels inside said inclusion mask over the sequence of frames, and a background appearance model from the background pixels inside said inclusion mask over the sequence of frames; and
- using the created foreground and background appearance models to segment one of the sequence of frames into definite foreground, definite background and uncertain pixels.

16. The non-transitory computer readable medium according to claim 15, wherein a foreground detection method based on regional convolutional neural networks (R-CNN) object detection is used to segment each of the sequence of frames into the foreground and background pixels.

17. The non-transitory computer readable medium according to claim 15, wherein shadows cast on the pitch are classified as the background pixel irrespective of a change detection status of the shadows.

18. The non-transitory computer readable medium according to claim 15, wherein the foreground appearance model is a foreground histogram accumulated from the foreground pixels and wherein the background appearance model is a background histogram accumulated from the background pixels.

19. The non-transitory computer readable medium according to claim 18, wherein the method further comprises creating Gaussian blurred colour histograms of the foreground and background pixels based on the foreground histogram and the background histogram.

20. The non-transitory computer readable medium according to claim 19, wherein the method further comprises determining a probability of whether a particular colour belongs to the foreground or background based on the Gaussian blurred colour histograms.

21. The non-transitory computer readable medium according to claim 20, wherein a pixel is determined as definite background if the probability of the pixel's colour being background is significantly larger than the probability of the pixel's colour being foreground, and a pixel is determined as definite foreground if the probability of the pixel's colour being foreground is significantly larger than the probability of the pixel's colour being background.

22. The non-transitory computer readable medium according to claim 19, wherein the method further comprises:
- creating a foreground mask based on the Gaussian blurred colour histograms;
- defining at least one region of interest that covers the foreground pixels of the foreground mask; and
- further segmenting the at least one region of interest into background and foreground.

23. The non-transitory computer readable medium according to claim 15, wherein the inclusion mask is created by dilating the pitch segmentation upward by the people's height.

24. The non-transitory computer readable medium according to claim 15, wherein the foreground appearance model and the background appearance model are updated based on a predetermined period of time or a predetermined number of frames.

25. The non-transitory computer readable medium according to claim 15, wherein the people's height is determined by retrieving an average height of a person.

26. A device comprising a processor and a memory, the memory comprising a software application program that is executable by the processor, wherein the processor executes the software application program to perform a method of detecting background pixels in a video, the video comprising a sequence of frames, each frame having a pitch and people, the method comprising:
- segmenting the pitch;
- determining a height of one of the people;
- creating an inclusion mask for the sequence of frames using the pitch segmentation and the people's height;
- segmenting each of the sequence of frames into foreground and background pixels;
- creating a foreground appearance model from the foreground pixels inside said inclusion mask over the sequence of frames, and a background appearance model from the background pixels inside said inclusion mask over the sequence of frames; and
- using the created foreground and background appearance models to segment one of the sequence of frames into definite foreground, definite background and uncertain pixels.

* * * * *